H. Miller.
Hand Rake.
No. 94,125. Patented Aug. 24, 1869.
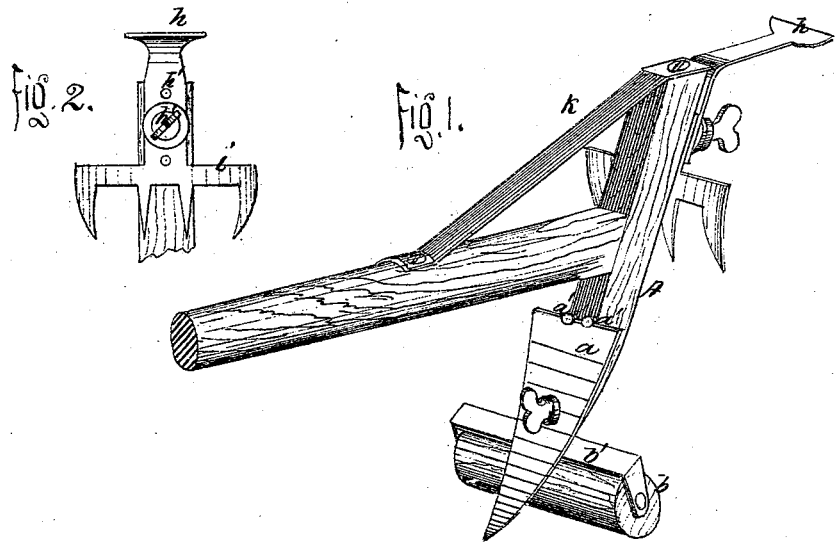
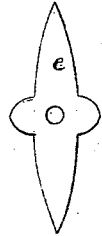
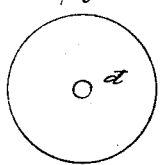
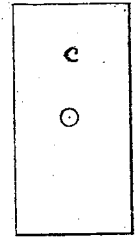
Witnesses:
Inventor:

United States Patent Office.

HENRY MILLER, OF ROADSIDE, VIRGINIA.

Letters Patent No. 94,125, dated August 24, 1869.

IMPROVEMENT IN GARDEN-IMPLEMENT.

The Schedule referred to in these Letters Patent and making part of the same.

*To all whom it may concern:*

Be it known that I, HENRY MILLER, of Roadside, in the county of Rockingham, and State of Virginia, have invented a new and improved Garden-Implement; and I do hereby declare that the following is a full, clear, and exact description of the construction and operation of the same, reference being had to the accompanying drawings, making a part of this specification, in which—

Figure 1 is a view in perspective.

Figure 2, a front elevation of the transplanter, as attached to the stock.

Figures 3, 4, and 5, plan views, respectively of the double-headed coulter, circular hoe, and four-sided hoe.

This invention consists in adapting to one stock, a variety of different instruments, to wit, a shovel, which being reversed, may be used as a plow, a four-edged hoe, a circular hoe, a reversible coulter, a roller, a rake, and a transplanter, all which may be used in succession with very little trouble of adjustment.

In the drawings—

A is a wooden or iron head or stock, with a suitable handle.

One end of the stock A is pointed, and the other end is squared off.

Upon the inside of the stock, and near the pointed end, is attached, by means of a set-screw, a triangular shield-shaped shovel, $a$, which, when the pointed end is down, may be used as a plow. It may be readily reversed by simply loosening the screw. When employed as a shovel, two pins, $a'$ $a'$, hold the narrow upper part of the plow-shovel between them.

By the same set-screw, a roller, $b$, is attached to the stock, the instrument $a$ being, for the time, removed.

The roller $b$ has a forked handle, $b'$, the set-screw being fastened between the forks, and the roller, by means of the forks, being capable of being set at any required distance from the point.

The roller having been in its turn removed, I have a four-sided hoe, $c$, which I apply to the stock, all the edges of which hoe are sharp, the narrower ones being more useful for cultivation, and the broader ones being more especially applicable to scraping and cleaning-purposes.

Instead of the oblong hoe $c$, we may employ a circular hoe, $d$, which proves very convenient, as it may be used whether the stock be side down or point down.

A substitute for the circular hoe, may be the double-headed reversible coulter $e$.

At the opposite end of the stock, I attach, by a set-screw and pin, $h'$, an instrument, $h$, projecting to the rear, which I call a transplanter, as it is very useful for lifting up plants from beneath, and setting them in new places, or for removing grass from the sides of plants, or fences, or garden-walks, places not easily accessible excepting to some such instrument.

The transplanter $h$ has a forked handle, like the roller, and may be removed altogether, or taken off the pin $h'$ and turned blade upward on the stock, in order to make room for the rake $i$, whose forked handle is fastened either beneath or upon that of the transplanter, in case the latter is turned up.

A rake of a larger size than $i$ may be attached in a similar manner to the side of the stock, and to the other side a larger-sized roller than $b$, which may be used alternately if desired.

The stock, and its handle, may be more firmly united by means of a brace, $k$.

The above combination of instruments forms, it is easy to see, a very convenient one for gardeners' uses. The tools may be reversed or removed without taking out the fastening-screws.

Having thus described my invention,

What I claim as new, and desire to secure by Letters Patent, is—

The combination of the stock A with the implements herein described, in the manner substantially as set forth.

HENRY MILLER.

Witnesses:
 CHAS. A. PETTIT,
 S. C. KEMON.